US012623233B2

(12) United States Patent
Kirschbaum et al.

(10) Patent No.: US 12,623,233 B2
(45) Date of Patent: May 12, 2026

(54) METHOD AND FLUIDIC MICROSYSTEM FOR THE DIELECTROPHORETIC MANIPULATION OF SUSPENDED PARTICLES

(71) Applicant: Fraunhofer-Gesellschaft zur Foerderung der angewandten Forschung e. V., Munich (DE)

(72) Inventors: Michael Kirschbaum, Potsdam (DE); Marten Tobias Gerling, Potsdam (DE); Nieves Godino Amado, Potsdam (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 601 days.

(21) Appl. No.: 18/016,817

(22) PCT Filed: Jul. 30, 2021

(86) PCT No.: PCT/EP2021/071433
§ 371 (c)(1),
(2) Date: Jan. 18, 2023

(87) PCT Pub. No.: WO2022/029036
PCT Pub. Date: Feb. 10, 2022

(65) Prior Publication Data

US 2023/0294109 A1 Sep. 21, 2023

(30) Foreign Application Priority Data

Aug. 3, 2020 (DE) ......................... 102020120425.6

(51) Int. Cl.

| | |
|---|---|
| ***B03C 5/02*** | (2006.01) |
| ***B01L 3/00*** | (2006.01) |
| ***B03C 5/00*** | (2006.01) |

(52) U.S. Cl.
CPC ........ *B03C 5/026* (2013.01); *B01L 3/502761* (2013.01); *B03C 5/005* (2013.01);
(Continued)

(58) Field of Classification Search
CPC ......... B03C 5/005; B03C 5/026; B03C 5/028; B01L 3/502761; B01L 2400/0424; B01L 2200/0652; B01L 2200/143
See application file for complete search history.

(56) References Cited

U.S. PATENT DOCUMENTS 6,727,451 B1 4/2004 Fuhr et al.
6,749,736 B1 * 6/2004 Fuhr ..................... C12M 35/02 204/600

(Continued)

FOREIGN PATENT DOCUMENTS

DE 19815882 A1 10/1999
DE 19860117 A1 7/2000

(Continued)

OTHER PUBLICATIONS

Boutros et al. (2015). Microscopy-based high-content screening. Cell, 163, 1314-1325.

(Continued)

*Primary Examiner* — C. Sun
(74) *Attorney, Agent, or Firm* — Caesar Rivise, PC

(57) ABSTRACT

The invention relates to a method for operating a fluidic microsystem (100) for the dielectrophoretic manipulation of suspended particles (1) having a particle diameter in a suspension liquid (2), wherein the microsystem (100) comprises: —a channel (10) having a longitudinal direction; —an electrode device (20) having an electrode (21), the longitudinal extent of which deviates from the longitudinal direction of the channel (10) and which has individually
(Continued)

controllable electrode segments (22) for producing dielectrophoretic forces which act on the particles (1), each electrode segment (22) having a deflection angle α, relative to the longitudinal direction of the channel (10), and a segment length ($s_i$), which determine a segment offset ($D_i$) perpendicular to the longitudinal direction of the channel (10); and —a control device (30). The method comprises: —producing a flow of the suspension liquid (2) with a flow velocity so that the particles (1) successively pass through an interaction region of the electrode (21), which interaction region is spanned by the electrode segments (22); and —activating the electrode segments (22) in order to deflect the particles (1) onto predetermined motion paths (4, 5), which are determined by a superposition of flow forces in the flow of the suspension liquid (2) and of the dielectrophoretic forces at the electrode segments (22). During the passage of each particle, each of the electrode segments (22) which are passed by the particle (1) is activated in a clocked manner for a predetermined activation duration, according to the desired motion path (4, 5), the activation duration of each electrode segment (22) being determined by the quotient of the segment length ($s_i$) of the electrode segment (22) and the flow velocity. The electrode segments (22) are dimensioned such that the segment offset ($D_i$) of each electrode segment (22) is less than the particle diameter. For the deflection of each particle (1), at least two successive electrode segments (22) cooperate.

22 Claims, 2 Drawing Sheets

(52) U.S. Cl.
CPC . *B01L 2200/143* (2013.01); *B01L 2300/0627* (2013.01); *B01L 2400/0424* (2013.01)

(56) References Cited

U.S. PATENT DOCUMENTS

| | | | |
|---|---|---|---|
| 7,070,684 | B1 | 7/2006 | Fuhr et al. |
| 2006/0177815 | A1 | 8/2006 | Soh et al. |
| 2012/0031759 | A1 | 2/2012 | Hausmann et al. |
| 2012/0312690 | A1 | 12/2012 | Pant et al. |
| 2013/0256197 | A1 | 10/2013 | Katsumoto |

FOREIGN PATENT DOCUMENTS

| | | | |
|---|---|---|---|
| DE | 19860118 | C1 | 9/2000 |
| EP | 3410107 | A1 | 12/2018 |

OTHER PUBLICATIONS

Godino et al. (2019). Combining dielectrophoresis and computer vision for precise and fully automated single-cell handling and analysis. Lap Chip, 19, 4016-4020.

Ho et al. (2005). Micromachined electrochemical T-switches for cell sorting applications. Lab Chip, 5, 1248-1258.

Kazemi et al. (2018). Numerical simulation of dielectrophoretic particle separation using slanted electrodes. Physics of Fluids, 30, 102003-1-102003-11.

Kirschbaum et al. (2008): T cell activation on a single-cell level in dielectrophoresis-based microfluidic devices. Journal of Chromatography A, 1202, 83-89.

Landenberger et al. (2012). Microfluidic sorting of arbitrary cells with dynamic optical tweezers. Lab Chip, 12, 3177-3183.

Li et al. (2018). Cellular dielectrophoresis coupled with single-cell analysis. Analytical and Bioanalytical Chemistry, 410, 2499-2515.

Meineke et al. (2016). A microfluidic opto-caloric switch for sorting of particles by using 3D-hydrodynamic focusing based on SLE fabrication capabilities. Lab Chip, 16, 820-828.

Nitta et al. (2018). Intelligent image-activated cell sorting. Cell, 175, 266-276.

Sakuma et al. (2017). On-chip cell sorting by high-speed local-flow control using dual membrane pumps. Lab on a Chip, 17, 2760-2767.

Shen et al. (2019). Recent advances in microfluidic cell sorting systems. Sensors and Actuators B: Chemical, 282, 268-281.

Isozaki et al. (2020). Sequentially addressable dielectrophoretic array for high-throughput sorting of large-volume biological compartments. Science Advances, 6(22), 1-11.

Song et al. "Continuous-flow sorting of stem cells and differentiation products based on dielectrophoresis." Lab on a Chip 15, No. 5 (2015): 1320-1328.

* cited by examiner

METHOD AND FLUIDIC MICROSYSTEM FOR THE DIELECTROPHORETIC MANIPULATION OF SUSPENDED PARTICLES

CROSS-REFERENCE TO RELATED APPLICATIONS

This application is a U.S. National Phase Application of PCT/EP2021/071433, filed Jul. 30, 2021, which claims priority to DE 10 2020 120 425.6, filed Aug. 3, 2020, the contents of which applications are incorporated herein by reference in their entireties for all purposes.

BACKGROUND OF THE INVENTION

The invention relates to a method for the dielectrophoretic manipulation of suspended particles, in particular for sorting of suspended particles, such as, for example, biological cells or microcompartments, in a fluidic microsystem. The invention relates further to a fluidic microsystem which is adapted for the dielectrophoretic manipulation, in particular for the sorting, of suspended particles. Applications of the invention are, for example, in the processing of particles, in particular of biological cells, microcompartments or other microobjects, in chemistry, medicine, biology or biochemistry.

In the present description, reference is made to the following prior art, which illustrates the technical background of the invention:

[1] M. Boutros et al. (2015): Microscopy-based high-content screening. Cell 163, 1314-1325;
[2] N. Godino et al. (2019): Combining dielectrophoresis and computer vision for precise and fully automated single-cell handling and analysis. Lab Chip 19, 4016-4020;
[3] C.-T. Ho et al. (2005): Micromachined electrochemical T-switches for cell sorting applications. Lab Chip 5, 1248-1258;
[4] M. Kirschbaum et al. (2008): T cell activation on a single-cell level in dielectrophoresis-based microfluidic devices. J Chromatogr A. 1202 (1), 83-89;
[5] B. Landenberger et al. (2012): Microfluidic sorting of arbitrary cells with dynamic optical tweezers. Lab Chip 12, 3177-3183;
[6] M. Li et al. (2018): Cellular dielectrophoresis coupled with single-cell analysis. Analytical and Bioanalytical Chemistry 410, 2499-2515;
[7] G. Meineke et al. (2016): A microfluidic opto-caloric switch for sorting of particles by using 3D-hydrodynamic focusing based on SLE fabrication capabilities. Lab Chip 16, 820-828;
[8] N. Nitta et al. (2018): Intelligent Image-Activated Cell Sorting. Cell 175(1):266-276;
[9] S. Sakuma et al. (2017): On-chip cell sorting by high-speed local-flow control using dual membrane pumps. Lab Chip 17, 2760-2767;
[10] Y. Shen et al. (2019): Recent advances in microfluidic cell sorting systems. Sensors & Actuators: B. Chemical 282, 268-281;
[11] DE 198 15 882 A1;
[12] DE 198 60 117 A1; and
[13] DE 198 60 118 C1.

In biology and medicine, there is a strong interest in the characterisation and processing of heterogeneous particle samples, such as, for example, heterogeneous cell samples. It is generally known that conventional flow cytometry allows large cell samples to be characterised within a short time on the basis of very simple markers ("low-content" markers), such as, for example, the size, granularity or integral fluorescence intensity of the biological cells. In order also to detect structural properties of individual cells or synthetic microcompartments in a spatially resolved manner ("high-content" markers), microscopy techniques are typically used. The "high-content" markers are highly relevant for modern biomedicine because biological processes, for example, are often determined by the spatial arrangement of cell constituents [1]. Thus, important cell properties, such as, for example, the antigen specificity of immune cells, coagulation disorders of blood platelets or the metastasisation potential of cancer stem cells, manifest themselves via the strength and nature of the interaction of cells with one another, the local protein distribution within the cell and/or via the number and arrangement of cellular constituents.

For functional analyses, it is important not only to be able to identify the cells on the basis of their phenotype but also to be able to sort them, which is possible on the basis of flow cytometry using the fluorescence-activated cell sorting (FACS) technique. However, it has hitherto not been possible to combine available FACS devices with microscopy techniques, and for that reason only "low-content" markers and not "high-content" markers can be detected. Owing to the complexity of biological processes, the FACS technique is therefore not suitable for many questions of biomedicine for sufficiently distinguishing individual cell types or subpopulations from one another.

Combination with a microscopy technique is possible for many fluidic microsystems with planar channel structures. By means of such systems, microscope image data from microscopy techniques or measured data from other complex measuring techniques can thus be used directly for the identification and sorting of cells on the basis of "high-content" markers. The sorting of suspended cells moving one behind the other in a channel of a fluidic microsystem can be carried out with micromechanical ([3]), optical ([5]), hydrodynamic ([7], [8] or [9]), electrokinetic ([2]) or other ([10]) forces.

While micromechanical approaches are complex and cost-intensive to produce, hydrodynamic forces can often be used only with low precision, and they require micromechanical actuators which are large or complicated to adjust, which stands in the way of a simple parallelisation of such methods. Optical forces are very weak and can therefore be used only at low flow velocities and in the visual field of a microscope, which limits the scope of application considerably. Electrokinetic forces have the advantage that they can be generated by electrodes integrated in the channel in a highly parallel manner and with a high local precision and integration density independently of the measurement of the cells, in particular of the optical visual field of a microscope. The application of electrokinetic forces is based, for example, on dielectrophoresis, in which a force action is generated in inhomogeneous high-frequency electric fields by polarisation of the cells ([6]).

Typically, in a channel of a fluidic microsystem, dielectrophoretic forces are generated by applying high-frequency electric fields to electrodes arranged on the upper and lower sides of the channel, so that repelling forces are exerted on the cells and a field barrier is formed by the electrodes (negative dielectrophoresis, see e.g. [4], [11], [12] and [13]).

An example of a channel 10' of a fluidic microsystem 100' having two pairs of electrodes 21A', 21B' is shown in FIG. 2 (prior art, see e.g. [11], [12] and [13]), wherein only the electrodes on the lower side of the channel are shown.

According to whether an electric field is or is not present at the electrodes 21A', 21B', it is impossible or possible for suspended cells 1' to pass the field barriers in question. For example, the cells 1' can pass the non-activated electrodes 21A' and cannot pass the activated electrodes 21B'.

Because the electrodes 21A', 21B' are arranged in the channel at a deflection angle α' obliquely to the flow direction, the cells, owing to the superposition of the flow forces in the flow of the suspension liquid and the dielectrophoretic forces, are guided in the channel along the electrodes or field barriers onto a different flow path, or they continue to follow their original flow path.

In the case of a sorting application, which is shown by way of example in FIG. 3 (prior art, see e.g. [11], [12] and [13]), cells 1A', 1B' in the fluidic microsystem 100' are to be flushed, following one another, through the planar channel 10' provided with a microscope 40' and are to be guided at a deflector by means of an electrode 21' to different subchannels 11', 12' of the microsystem 100' in dependence on properties of the cells 1A', 1B' detected by the microscope 40'.

The order of the cells 1A', 1B' in the channel 10' should be maintained or at least monitored by measurement techniques at least in the time interval between image recording by the microscope 40' and the sorting operation (in particular during the time period required for image processing), because otherwise it is scarcely possible to correctly associate a detected and analysed cell and a cell to be sorted.

The reliability of the electrode function, with which the particles can be deflected from their hydrodynamic flow lines (movement paths) at a given flow velocity, depends on the deflection angle of the deflection electrode relative to the channel direction and flow direction (angle between the channel direction and the longitudinal direction of the electrode extension). The smaller the deflection angle, the more reliable the operation of the electrode. This means that, when a predetermined target offset (displacement of the particles perpendicular to the flow direction) is specified, the required interaction length (or: detection length) of the electrode becomes greater as the deflection angle falls. The reliability in particular of the sorting function of the electrode 21' is thus associated in particular with the interaction length L' of the electrode 21' in the longitudinal direction (flow direction) of the channel 10'. The electrode 21' of FIG. 3 has a greater interaction length L' and thus greater reliability of the sorting function than the electrode 21B' according to FIG. 2.

However, the interaction length L' also determines the minimum spacing of the cells 1' flowing one behind the other in the channel 10' at which the individual cells 1' can still be handled independently of one another and the error-free sorting thereof is still possible without likewise detecting or influencing following cells 1A'. For example, in the situation shown in FIG. 3, the cell density is so high that the different cells 1A', 1B' cannot be separated and guided to the different subchannels 11', 12' as desired.

There is an interest in executing flow sorting methods with a maximum throughput (number of cells processed per unit time). The throughput is equal to the product of the flow velocity and the cell density of the sample. There is a tradeoff between the two parameters: a high flow velocity requires a large interaction length of the electrode in order to maintain the reliability of the sorting function, while a small interaction length of the electrode is desirable for a high cell density.

In order to achieve a high throughput, that is to say for sorting with a high cell density and a high flow velocity, there is thus an interest in using electrodes with a small interaction length and at the same time avoiding adversely affecting the reliability of the electrode function at the high flow velocity. However, the conventional techniques, for example according to [11], [12] and [13], are distinguished by a relatively large interaction length of the electrodes, so that the mentioned requirements cannot be met or can be met to only a limited extent in the manipulation of cells by dielectrophoretic forces.

It is known from [12] and [13] to divide electrodes whose overall length exceeds the particle diameter by a factor of from 20 to 50 into individual electrode segments. The function of the conventional division is to create, by means of the electrode segments, additional degrees of freedom in the configuration of a field generated by an electrode or the shape of the field barrier. For example, in the activation of electrode segments according to [12], individual electrode segments can be deactivated (switched off) in order to allow particles on a specific trajectory in the channel of the microsystem to pass, while all other electrode segments are jointly activated. In [13], a planar array of point-like electrode segments is described, which permits a flexible configuration of the shape of the field barrier by activation of selected electrode segments within the array. However, the conventional segmentation of the electrodes does not allow the throughput and the reliability of the particle manipulation to be increased at the same time.

The mentioned limitations of the conventional techniques occur not only in the manipulation of biological cells but also in the case of non-biological particles, such as, for example, synthetic microcompartments or carrier particles of chemical substances.

The objective of the invention is to provide an improved method for operating a fluidic microsystem for the dielectrophoretic manipulation of suspended particles in a suspension liquid and/or an improved fluidic microsystem for the dielectrophoretic manipulation of suspended particles, with which disadvantages of conventional techniques are avoided. It is to be possible in particular to carry out the dielectrophoretic manipulation of the suspended particles with an increased particle density without adversely affecting the reliability of the electrode function.

This objective is achieved by a method for operating a fluidic microsystem and by a fluidic microsystem of the invention.

BRIEF SUMMARY OF THE INVENTION

According to a first general aspect of the invention, the above objective is achieved by a method for operating a fluidic microsystem for the dielectrophoretic manipulation of suspended particles having a predetermined particle diameter in a suspension liquid. The fluidic microsystem comprises a channel having a longitudinal direction, an electrode device having an elongate electrode (deflection electrode), the longitudinal extension of which deviates from the longitudinal direction of the channel and which has a plurality of individually activatable electrode segments (partial electrodes) for generating dielectrophoretic forces acting on the particles, wherein each electrode segment has a deflection angle (electrode angle) ($\alpha_i$) relative to the longitudinal direction of the channel and a segment length ($s_i$), which determine a segment offset ($D_i$) transverse to the longitudinal direction of the channel, and a control device by means of which the electrode segments can be activated.

The method for operating the fluidic microsystem comprises the steps of generating a flow of the suspension liquid with a flow velocity in the channel, so that the suspended particles in succession pass an interaction region of the electrode which is spanned by the electrode segments, and activating the electrode segments in order to deflect the particles in the channel onto predetermined movement paths which are determined by a superposition of flow forces in the flow of the suspension liquid and the dielectrophoretic forces generated at the electrode segments.

According to the invention, as each particle passes, each of the electrode segments which the particle passes in succession is activated in a clocked manner by the control device in dependence on the desired movement path in each case for a predetermined activation time. The activation time of each electrode segment is determined by the quotient of the segment length ($s_i$) of the electrode segment and the flow velocity. Furthermore, according to the invention, the electrode segments are dimensioned such that the segment offset ($D_i$) of each electrode segment is smaller than the particle diameter, and in each case at least two successive electrode segments cooperate for the deflection of the particles.

According to a second general aspect of the invention, the above objective is achieved by a fluidic microsystem adapted for the dielectrophoretic manipulation of particles having a predetermined particle diameter in a suspension liquid. The microsystem comprises a channel having a longitudinal direction, an electrode device having an elongate electrode, the longitudinal extension of which deviates from the longitudinal direction of the channel and which has a plurality of individually activatable electrode segments for generating dielectrophoretic forces acting on the particles, wherein each electrode segment has a deflection angle ($\alpha_i$) relative to the longitudinal direction of the channel and a segment length ($s_i$), which determine a segment offset ($D_i$) transverse to the longitudinal direction of the channel, and a control device by means of which the electrode segments can be activated. The channel is adapted to receive a flow of the suspension liquid with a flow velocity such that the suspended particles pass in succession through an interaction region of the electrode which is spanned by the electrode segments. The control device is adapted to activate the electrode segments in order to deflect the particles in the channel onto predetermined movement paths which are determined by a superposition of flow forces in the flow of the suspension liquid and the dielectrophoretic forces generated at the electrode segments.

According to the invention, the control device is adapted, as each particle passes, to activate in a clocked manner each of the electrode segments which the particle passes in succession in dependence on the desired movement path in each case for a predetermined activation time, wherein the activation time of each electrode segment is determined by the quotient of the segment length ($s_i$) of the electrode segment and the flow velocity. Furthermore, according to the invention, the electrode segments are so dimensioned that the segment offset ($D_i$) of each electrode segment is smaller than the particle diameter. Furthermore, according to the invention, the control device is adapted to activate the electrode segments so that in each case at least two successive electrode segments cooperate for the deflection of the particles.

The method according to the first general aspect of the invention or one of its preferred embodiments is preferably executed with the fluidic microsystem according to the second general aspect of the invention or one of its preferred embodiments.

Advantageously, the objective of the invention is achieved in particular in that the electrode segments of an electrode are activated in a particle-specific clocked manner, that is to say in each case for the predetermined activation time. The activation time is at least equal to the time interval required by a particle to pass an electrode segment. Each particle passes each of the electrode segments for a specific time interval, which is determined by the segment length and the flow velocity. Because the time intervals of the passage of each particle past each of the electrode segments and thus also the position of the time intervals relative to one another are predefined, the electrode segments can specifically be activated individually for the activation times.

In contrast to [12], it is provided according to the invention to continuously activate all the electrode segments particle-specifically. The activation of the electrode segments travels with the particles which arrive at the electrode. The activation of an electrode segment at a specific point in time affects only the particle that is passing the electrode segment in question. At the same time, the activation of the electrode segment has no effect on particles that at the point in time are located at other electrode segments of the electrode. Accordingly, the particles can pass the electrode with a greater cell density (number of cells per unit length in the channel), so that the throughput increases. The electrode has a specific, optionally different action for each particle, even if multiple particles are located within the interaction length of the electrode as a whole.

Furthermore, because, unlike in [12], the segment offset ($D_i$) of each electrode segment is smaller than the particle diameter and in each case at least two successive electrode segments cooperate for the deflection of each particle, the flow velocity in the microsystem can be chosen to be relatively high according to the invention, without disadvantages owing to the resulting high total interaction length of the electrode having to be accepted in respect of the particle density.

Advantageously, the above-mentioned tradeoff between the flow velocity and the cell density of the sample is resolved. Samples with an increased density can reliably be manipulated, in particular sorted, even at a high flow velocity.

The dielectrophoretic manipulation of the particles generally comprises a displacement of particles through the cooperation of the dielectrophoretic forces and the flow forces onto predetermined movement paths within the channel of the microsystem, for example for distribution of the particles onto the movement paths, a change in the order of the particles or preferably sorting of the particles into different channels downstream of the electrode device. In order to move a particle, starting from an initial movement path, onto another movement path within the channel of the microsystem, the electrode segments which the particle passes in succession are successively activated by the control device until the particle, owing to the segment offset at activated electrode segments, reaches the desired movement path, and the electrode segment located therein is not activated.

The invention can advantageously be used with different types of particles, which include, for example, biological particles, such as biological cells or constituents thereof, or non-biological particles, such as carrier particles with chemical substances or macromolecules. All the particles can have the same diameter (homogeneous particle sample). Alternatively, the particles can each have different diameters (heterogeneous particle sample), wherein in this case the segment offset is smaller than the smallest particle diameter. The particles generally comprise microobjects with a characteristic size, for example diameter, which is preferably equal to or greater than 1 μm and/or equal to or less than 1 mm. This size range has advantages in particular with regard to the observability of the particles with a sufficient optical resolution, the dielectrophoretic forces, and/or the obtainment of laminar flow conditions. The particles can include biological particles, such as, for example, animal or plant cells or bacteria or cell clusters. The diameters of biological cells are, for example, in the range of from 5 μm to 25 μm and the diameters of cell clusters are, for example, in the range of from 25 μm to 250 μm. Alternatively or additionally, the particles can include non-biological microobjects, such as, for example, plastics particles and/or semiconductor particles. The suspension liquid is a liquid medium, such as, for example, an aqueous solution, in the case of the manipulation of biological cells in particular a physiologically acceptable liquid or a culture medium.

An "electrode" is typically formed of two mutually congruent groups of electrode segments on mutually opposite channel walls, for example the channel lower side and channel upper side. Alternatively, an electrode can comprise a single group of electrode segments on a single channel wall. The elongate electrode, the longitudinal extension of which deviates from the longitudinal direction of the channel, typically has the form of a linear, piecewise linear or curved strip composed of the successively arranged electrode segments, which encloses the deflection angle with the longitudinal direction of the channel. Mutually facing ends of the electrode segments are separated and electrically insulated from one another. The electrode segments can all have the same deflection angle or can each have different deflection angles. In the case of curved electrode segments, the deflection angle can be determined by a tangent at the electrode segment, for example at one of its ends or its middle.

By means of the electrode, the particles in the channel are each deflected onto predetermined movement paths. The movement paths are flow paths or trajectories of the particles which are arranged in the channel side by side in the flow direction. In the region of the electrode device, the channel preferably has a linear pathway, and the movement paths accordingly run in parallel according to the flow profile of a laminar flow formed in the channel.

According to preferred embodiments of the invention, the following features can be provided individually or in combination. The segment lengths ($s_i$) of the electrode segments can be less than or equal to 10 times the particle diameter, in particular less than or equal to twice the particle diameter or even less than or equal to once the particle diameter. Advantageously, shorter local interaction lengths of the individual electrode segments than in the prior art are thus achieved. The detection length is shortened and the space requirement in the microsystem is reduced. The segment lengths ($s_i$) of the electrode segments can be, for example, less than or equal to 50 μm, in particular less than or equal to 10 μm. Furthermore, the segment lengths are preferably at least equal to or greater than the tenth part of the particle diameter. Alternatively or additionally, the deflection angles ($\alpha_i$) of the electrode segments can be less than 10°, in particular from less than 5° to almost 0°. The deflection angles (a) of the electrode segments are in particular significantly smaller than the deflection angles disclosed, for example, in [12]. Advantageously, owing to the small deflection angles, the reliability of the field barrier formed by the electrode and the reliability of the manipulation of the particles are improved.

The activation times of the electrode segments can be chosen in dependence on the particle size and the flow velocity. For example, in particular with a particle diameter of 100 μm and a flow velocity of 1 mm/s, the activation times of the electrode segments can be chosen to be equal to or less than 100 ms, in particular equal to or less than 50 ms, particularly preferably 20 ms or 30 ms or even less. Advantageously, such short activation times of the electrode segments allow the throughput of the particle manipulation to be increased owing to the possibility of choosing a higher advance rate/flow velocity.

According to a further advantageous embodiment of the invention, position detection for determining at least one particle position of each particle and activation of the electrode segments in dependence on the at least one particle position of each particle are provided. Advantageously, as a result of the position detection, a sequence of time segments in which the particle in question passes the individual electrode segments can be determined. The activation times of the electrode segments correspond to the detected time segments. The electrode segments can be activated or not activated for each particle for the duration of the respective time segments.

Preferably, the fluidic microsystem is correspondingly provided with a position detection device with which the at least one particle position of each particle can be detected, wherein the control device is adapted to activate the electrode segments in dependence on the at least one particle position of each particle.

According to an advantageous variant, the position detection comprises monitoring of the interaction region of the electrode with a microscope device, wherein the electrode segments which the particle passes in succession are detected directly with the microscope device. Correspondingly, the position detection device of the microsystem comprises the microscope device, which is arranged to observe the interaction region of the electrode and to directly detect the electrode segments which the particle passes in succession. This variant is particularly advantageous if the position detection at the same time permits a sorting decision in real time, that is to say without or with a negligibly small delay.

According to an alternative, particularly preferred variant, the position detection comprises monitoring of a monitoring region upstream of the interaction region of the electrode with a microscope device, wherein the monitoring region is spaced apart from each of the electrode segments by a predetermined channel length and the electrode segments which the particle passes in succession are determined from an observation time of the particles in the monitoring region, the channel lengths and the flow velocity. Correspondingly, the microscope device forms a position detection device of the microsystem which is arranged upstream of the electrode. Advantageously, the position detection can be combined with image processing for an identification of particle features, wherein, as a result of the run time of each particle along the channel length, sufficient time is available for the image processing and, for example, a sorting decision.

According to a further, particularly preferred embodiment of the invention, detection of at least one particle property of each particle is provided, wherein activation of the electrode segments takes place in dependence on the at least one particle property. The control device is preferably adapted to activate the electrode in dependence on at least one particle property. The particle property preferably includes at least one of a particle structure and at least one particle substance.

The particle property is detected, for example, by optical and/or photonic methods, for example scatter measurements, and/or by lensless X-ray diffraction. The particle property is particularly preferably detected with the microscope device in conjunction with an image analysis device with which at least one particle property can be determined from image data of each particle.

Image-data-based particle sorting, in particular cell sorting, with a high throughput is a major advantage for all areas of the life sciences and cell-based medicine. Precise and reliable isolation of cells, in particular in the clinical context, provides new cell-therapeutic ways and standards with high social and economic potential (e.g. in CAR T-cell therapy). The image-data-based sorting of cells further has applications in basic biomedical research, in particular in the development of active substances, such as, for example, the fields of drug screening, immuno-oncology or stem cell production. Preferably, a distribution of the particles in the microsystem is chosen such that multiple particles are located in the interaction region of the electrode, wherein, when averaged over time, not more than one of the particles is located at each electrode segment. Advantageously, the distribution of the particles can be determined at the same time as the detection of at least one particle property. Particles with such a small spacing that at least two particles pass an electrode segment simultaneously can be identified and discarded.

According to a preferred application of the invention in particle sorting, it is provided that the channel of the microsystem is divided downstream of the interaction region of the electrode into multiple subchannels, and each of the particles is moved into one of the subchannels by the activation of the electrode segments in dependence on the at least one particle property. In this case, the control device is adapted to move each of the particles into one of the subchannels by activating the electrode in dependence on the at least one particle property of the particle. Advantageously, the sorting function of the electrode can be fulfilled particle-specifically, even if multiple particles are located within the interaction length of the electrode. Each electrode segment at which a particle is currently located is controlled (activated or not activated) according to the detected particle property and the sorting decision.

According to a further advantageous embodiment of the invention, the flow velocity of the suspension is set at a predefined constant value by a control loop. The microsystem, in particular the control device, is preferably coupled with the control loop. Advantageously, a constant flow velocity permits increased accuracy of the setting of the activation time of the electrode segments.

BRIEF DESCRIPTION OF THE DRAWINGS

Further details and advantages of the invention are described hereinbelow with reference to the accompanying drawings, in which.

DETAILED DESCRIPTION OF PREFERRED EMBODIMENTS OF THE INVENTION

Features of embodiments of the invention will be described by way of example hereinbelow with reference to the sorting of biological cells into two subchannels at a Y-branch of a channel of a fluidic microsystem. It is emphasised that the application of the invention is not restricted to this example but is correspondingly possible in a different manipulation of particles, for example for their displacement onto one of more than two movement paths in the channel, for example in order for a redistribution or for a change of the particle spacings. Instead of the manipulation of biological cells, a manipulation of other, in particular non-biological particles can be provided according to the invention. When implementing the invention in practice, sizes and forms of the parts of the microsystem in particular can be chosen in dependence on the requirements of the concrete application. Details of the structure and operation of fluidic microsystems, in particular the generation of high-frequency electric fields for electrode activation, and of the detection of particle properties, for example by the processing of measured data of a microscope, are not described because they are known per se from the prior art.

Figure 1:
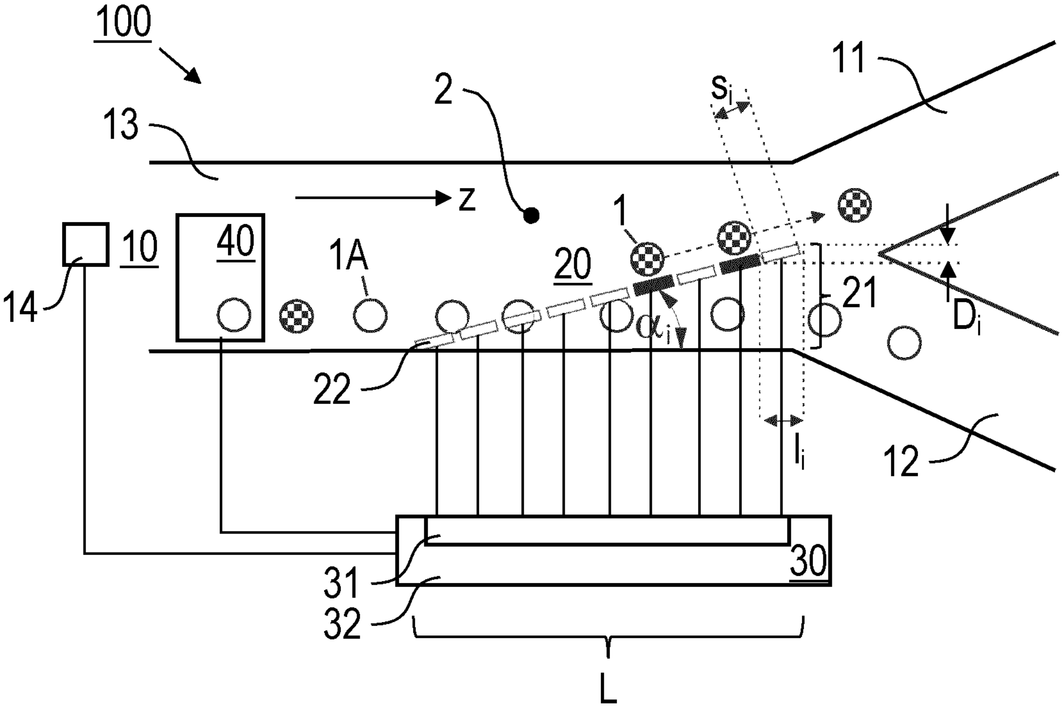
FIG. 1: shows a schematic illustration of features of embodiments of the method according to the invention and of the fluidic microsystem according to the invention.
Figure 2:
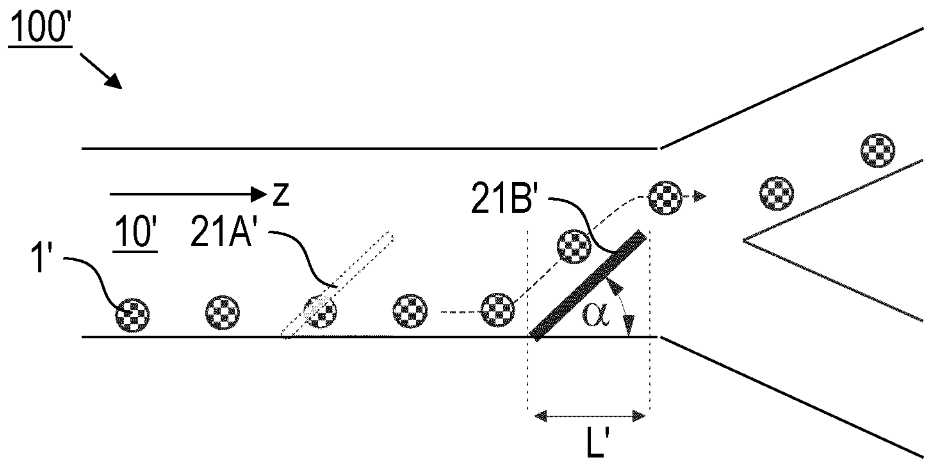
FIGS. 2 and 3: show schematic illustrations of conventional fluidic microsystems.
Figure 3:
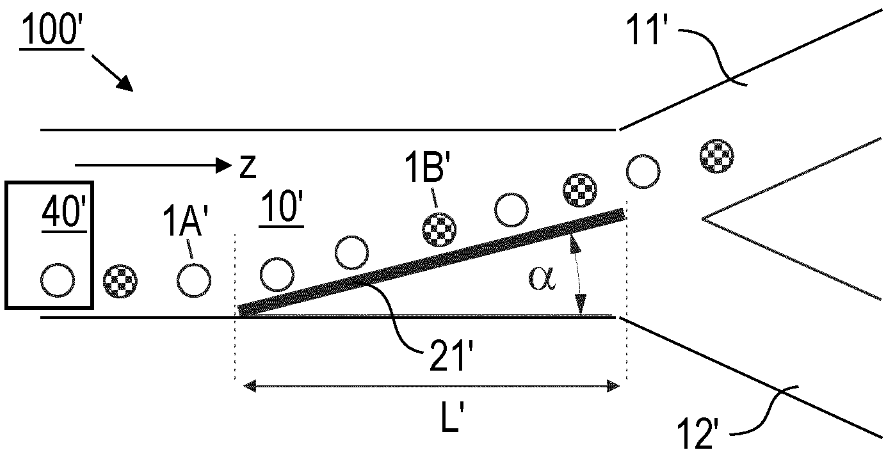

FIG. 1 shows, in a schematic plan view, the channel 10 of the fluidic microsystem 100 having an electrode device 20, a control device 30 and a microscope device 40. The channel 10 extends linearly in a longitudinal direction z up to a branch into two subchannels 11, 12. The channel 10 has, for example, a rectangular cross section with a width in the range of from 20 μm to 1000 mm and a height in the range of from 5 μm to 1 mm. The planar lower side is also referred to as the channel bottom 13 and the planar upper side as the cover surface (not shown). In the channel there are cells 1, 1A, which are suspended in a suspension liquid 2. On actuation of a pump device 14, a flow of the suspension liquid is generated in the channel 10 in a flow direction that coincides with the longitudinal direction z.

The electrode device 20 comprises the electrode 21, which is divided into a plurality of electrode segments 22. In the example shown, the electrode 21 has the form of a linear strip which is formed by the linear electrode segments 22 arranged in series. Only the electrode 21 on the channel bottom 13 is shown in FIG. 1. A further electrode (not shown) having the same size and form and orientation relative to the channel 10, or alternatively a planar counter-electrode, is preferably arranged on the cover surface. The longitudinal extension of the electrode 21 forms with the longitudinal direction z of the channel 10 a deflection angle $\alpha_l$, which because of the linear electrode form forms the deflection angle $\alpha_l$ of each electrode segment 22. The electrode segments 22 have a segment length $s_i$ in the longitudinal direction z of the channel 10 and a segment offset $D_i$ transverse to the longitudinal direction z of the channel 10. Accordingly, each electrode segment 22 has an associated interaction length $l_i$. The interaction length (detection length) L of the electrode 21 as a whole is given by the sum of the individual interaction lengths $l_i$ of the electrode segments 22 and their mutual spacings. In the example shown, all the electrode segments 22 have the same interaction lengths $l_i$.

The electrode 21 is divided into the electrode segments 22 in order to be able to operate with a maximum cell density at a minimum deflection angle, whereby a stepwise deflection of the cells with a minimal width of the segment offset $D_i$ (sorting window) is possible. Ideally, the division is such that the width of the segment offset $D_i$ is in the order of magnitude of the cell diameter. The individual electrode segments 22 can be switched on and off again in succession, so that only the electrode segment 22 at which the cell to be sorted is located is ever active. Even cells that are following behind very closely can thus be handled independently of the preceding cell. In a concrete embodiment there are provided, for example, 20 electrode segments 22 each having a segment length $s_i$ of 20 μm and a deflection angle at of 3°, wherein an interaction length L of the electrode 21 as a whole of 0.2 mm is obtained. The width of the electrode 21 is, for example, 10 μm.

The control device 30 comprises an electrode voltage source 31 and a computer unit 32. The electrode voltage source 31, the microscope device 40 and the pump device 14 are controlled by means of the computer unit 32. The computer unit 32 is further designed to analyse image data of the microscope device 40, to detect particle properties of the cells 1, 1A and to generate a sorting decision in dependence on the detected particle properties. The electrode voltage source 31 is designed to generate high-frequency electric voltages for activating the electrode 21. According to the invention, each electrode segment 22 is activated individually. To that end, the electrode voltage source 31 has a group of output channels, the number of which is equal to the number of electrode segments 22. Each output channel is connected to one of the electrode segments 22 of the electrode 21 and to one of the electrode segments of the electrode (not shown) on the cover surface of the channel 10.

The microscope device 40 comprises, for example, a transmitted-light or fluorescence microscope which is arranged to acquire images in a monitoring region upstream of the interaction region of the electrode 21. The cover surface of the channel 10 is transparent in the monitoring region. At the same time, the microscope device 40 forms a position detection device with which the particle position of the cells 1, 1A can be detected. To that end, the passage of the cells 1, 1A through the monitoring region and the associated observation time are detected. In conjunction with the flow velocity in the channel 10 and the segment lengths $l_i$, the time intervals at which the particles 1, 1A pass the electrode segments 22 are obtained.

In the time segment between the observation time and the reaching of the first electrode segment 22, the computer unit 32 performs the analysis of the image data of the microscope device 40, the detection of particle properties of the cells 1, 1A, such as, for example, size, shape, co-localisation of fluorescent-stained membrane proteins, and the sorting decision.

For cell sorting in the channel 10, the cells 1, 1A suspended in the suspension liquid 2, such as, for example, cell culture medium, buffer solution, etc., flow through the monitoring region of the microscope device 40 to the electrode device 20. A particle property and the time interval of the passage past the electrode segments 22 are associated with each cell. By application of high-frequency electric voltages, the electrode segments 22 are activated for activation times equal to the respective time intervals of the passage. If a field is not generated at an electrode segment 22 (the electrode 21 is locally inactive), the cells are freely able to pass the electrode segment 22. If a field is generated at an electrode segment 22 (the electrode 21 is locally active), the cells are prevented from passing by negative dielectrophoresis and are deflected onto a different movement path according to the electrode geometry and the hydrodynamic propulsion. As a result of the division of the electrode 21 into the electrode segments 22 with a relatively small deflection angle $\alpha_i$, the effective detection length of the electrode 21 is minimised, so that even cells 1, 1A that follow one another closely can be individually sorted and can reach the subchannels 11, 12 correctly separated.

In contrast to methods described hitherto (e.g. [8]), the use of the described sorting function allows very dense cell samples to be processed. In combination with a parallelisation (which is simple to carry out) of the system, the same throughput can therefore be achieved with significantly lower flow velocities, which facilitates optical image acquisition and the handling of dead times potentially caused by the image processing. In addition, the complex microfluidic control elements that are necessary at high flow velocities are not required, which further reduces the complexity of the method and thus improves the compactness, costs and operability of the system considerably.

The features of the invention that are disclosed in the preceding description, the drawings and the claims can be of importance for the implementation of the invention in its various embodiments both individually and in combination or sub-combination.

The invention claimed is:

1. A method for operating a fluidic microsystem for dielectrophoretic manipulation of suspended particles having a predetermined particle diameter in a suspension liquid, wherein the fluidic microsystem comprises:

a channel having a longitudinal direction, an electrode device having an elongate electrode, a longitudinal extension of which deviating from a longitudinal direction of the channel and which has electrode segments that are individually activatable for generating dielectrophoretic forces acting on the suspended particles, wherein each electrode segment has a deflection angle relative to the longitudinal direction of the channel and a segment length, which determine a segment offset transverse to the longitudinal direction of the channel, and a control device by way of which the electrode segments can be activated, wherein the method comprises the steps:

generating a flow of the suspension liquid with a flow velocity in the channel, so that the suspended particles in succession pass an interaction region of the elongate electrode which is spanned by the electrode segments, activating the electrode segments in order to deflect the suspended particles in the channel onto predetermined movement paths which are determined by a superposition of flow forces in the flow of the suspension liquid and the dielectrophoretic forces generated at the electrode segments, wherein as each particle passes, each of the electrode segments which the particle passes in succession is activated in a clocked manner by the control device in dependence on a desired movement path in each case for a predetermined activation time, wherein the activation time of each electrode segment is determined by a quotient of the segment length of each electrode segment and the flow velocity, and the electrode segments are so dimensioned that the segment offset of each electrode segment is smaller than the particle diameter, and in each case at least two successive electrode segments cooperate for a deflection of each particle.

2. The method according to claim 1, wherein the segment length of each electrode segment is less than or equal to 10 times the particle diameter.

3. The method according to claim 1, wherein the segment length of each electrode segment is less than or equal to twice the particle diameter.

4. The method according to claim 1, wherein the deflection angle of each electrode segment is less than 10°.

5. The method according to claim 1, wherein the deflection angle of each electrode segment is less than 5°.

6. The method according to claim 1, further comprising the steps of position detection for determining at least one particle position of each particle, and activation of the electrode segments in dependence on the at least one particle position of each particle.

7. The method according to claim 6, wherein the position detection comprises monitoring of the interaction region of the electrode with a microscope device with which the electrode segments which each particle passes in succession are detected directly.

8. The method according to claim 6, wherein the position detection comprises observing of a monitoring region upstream of the interaction region of the electrode with a microscope device, wherein the monitoring region is spaced apart from each of the electrode segments by a predetermined channel length and the electrode segments which each particle passes in succession are determined from an observation time of each particle in the monitoring region, the predetermined channel length and the flow velocity.

9. The method according to claim 1, further comprising the step of detection of at least one particle property of each particle, wherein activation of the electrode segments takes place in dependence on the at least one particle property.

10. The method according to claim 9, wherein the channel is divided downstream of the interaction region of the electrode into multiple subchannels, and each of the suspended particles is moved into one of the subchannels by the activation of the electrode segments in dependence on the at least one particle property.

11. The method according to claim 1, wherein the flow velocity of the suspension liquid is set at a predefined constant value by a control loop.

12. The method according to claim 1, wherein a distribution of the particles is chosen such that multiple particles are located in the interaction region of the electrode, wherein, when averaged over time, not more than one of the particles is located at each electrode segment.

13. A fluidic microsystem configured for dielectrophoretic manipulation of particles having a predetermined particle diameter in a suspension liquid, comprising:

a channel having a longitudinal direction, an electrode device having an elongate electrode, a longitudinal extension of which deviating from the longitudinal direction of the channel and which has a plurality of individually activatable electrode segments for generating dielectrophoretic forces acting on the particles, wherein each electrode segment has a deflection angle relative to the longitudinal direction of the channel and a segment length, which determine a segment offset transverse to the longitudinal direction of the channel, and a control device by way of which the electrode segments can be activated, wherein the channel is configured to receive a flow of the suspension liquid with a flow velocity such that the suspended particles pass in succession through an interaction region of the electrode which is spanned by the electrode segments, wherein the control device is configured to activate the electrode segments in order to deflect the particles in the channel onto predetermined movement paths which are determined by a superposition of flow forces in the flow of the suspension liquid and the dielectrophoretic forces generated at the electrode segments, the control device is configured, as the particles pass, to activate in a clocked manner each of the electrode segments which one of the particles passes in succession in dependence on a desired movement path in each case for a predetermined activation time, wherein the activation time of each electrode segment is determined by a quotient of the segment length of each electrode segment and the flow velocity, the electrode segments are so dimensioned that the segment offset of each electrode segment is smaller than the particle diameter, and the control device is configured to activate the electrode segments so that in each case at least two successive electrode segments cooperate for a deflection of each particle.

14. The fluidic microsystem according to claim 13, wherein the segment length of each electrode segment is less than or equal to 10 times the particle diameter.

15. The fluidic microsystem according to claim 13, wherein the segment length of each electrode segment is less than or equal to 100 μm.

16. The fluidic microsystem according to claim 13, wherein the segment length of each electrode segment is less than or equal to 10 μm.

17. The fluidic microsystem according to claim 13, which comprises a position detection device with which at least one particle position of each particle can be detected, wherein the control device is configured to activate the electrode segments in dependence on the at least one particle position of each particle.

18. The fluidic microsystem according to claim 17, wherein the position detection device comprises a microscope device which is arranged to observe the interaction region of the electrode and to directly detect the electrode segments which each particle passes in succession.

19. The fluidic microsystem according to claim 17, wherein the position detection device comprises a microscope device which is arranged to observe an monitoring region upstream of the interaction region of the electrode with the microscope device, wherein the monitoring region is spaced apart from each of the electrode segments by a predetermined channel length, and the control device is configured to determine the electrode segments which each particle passes in succession from an observation time of each particle in the monitoring region, the predetermined channel length and the flow velocity.

20. The fluidic microsystem according to claim 13, wherein the control device is configured to activate the electrode in dependence on at least one particle property.

21. The fluidic microsystem according to claim 20, wherein the channel divides into multiple subchannels downstream of the interaction region of the electrode, wherein the control device is configured to move each of the particles into one of the subchannels by activation of the electrode in dependence on the at least one particle property of each particle.

22. The fluidic microsystem according to claim 13, comprising a control loop with which the flow velocity of the suspension liquid can be set at a predefined constant value.

* * * * *